(12) United States Patent
Kuromi (10) Patent No.: US 10,176,929 B2
(45) Date of Patent: Jan. 8, 2019

(54) SOLID ELECTROLYTIC CAPACITOR

(71) Applicant: Murata Manufacturing Co., Ltd., Nagaokakyo-shi, Kyoto-fu (JP)

(72) Inventor: Hitoshi Kuromi, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 15/353,928

(22) Filed: Nov. 17, 2016

(65) Prior Publication Data
US 2017/0140877 A1  May 18, 2017

(30) Foreign Application Priority Data

Nov. 18, 2015 (JP) ................. 2015-225687

(51) Int. Cl.
| | | |
|---|---|---|
| H01G 9/04 | (2006.01) |
| H01G 9/012 | (2006.01) |
| H01G 9/10 | (2006.01) |
| H01G 9/045 | (2006.01) |
| H01G 9/048 | (2006.01) |
| H01G 9/15 | (2006.01) |

(52) U.S. Cl.
CPC ............ *H01G 9/045* (2013.01); *H01G 9/012* (2013.01); *H01G 9/048* (2013.01); *H01G 9/10* (2013.01); *H01G 9/15* (2013.01)

(58) Field of Classification Search
CPC ........ H01G 9/045; H01G 9/012; H01G 9/048; H01G 9/10; H01G 9/15
USPC ........................................... 361/528
See application file for complete search history.

(56) References Cited

U.S. PATENT DOCUMENTS

| | | | |
|---|---|---|---|
| 6,909,596 B2 | 6/2005 | Shimoyama et al. | |
| 2004/0264111 A1 | 12/2004 | Shimoyama et al. | |
| 2008/0158782 A1* | 7/2008 | Cheng | H01G 9/012 361/524 |
| 2011/0149477 A1* | 6/2011 | Summey | H01G 9/0029 361/528 |
| 2016/0118195 A1* | 4/2016 | Chiu | H01G 9/048 361/528 |

FOREIGN PATENT DOCUMENTS

| | | |
|---|---|---|
| JP | 2005026257 A | 1/2005 |
| JP | 2013-51378 A | 3/2013 |

\* cited by examiner

*Primary Examiner* — Michael P McFadden
(74) *Attorney, Agent, or Firm* — Arent Fox LLP (57) ABSTRACT

A solid electrolytic capacitor that includes a capacitor element that having an anode with a core portion and a porous portion, a dielectric layer covering the porous portion, and a cathode including a solid electrolyte layer covering at least part of the dielectric layer; an exterior body that encloses the capacitor element so as to expose an end of the anode; a first external electrode connected to the cathode; and a second external electrode connected to the end of the anode. The thickness of the porous portion at the end of the anode that is exposed from the exterior member is smaller than the thickness of the porous portion in a region covered by the cathode.

13 Claims, 6 Drawing Sheets

SOLID ELECTROLYTIC CAPACITOR

CROSS REFERENCE TO RELATED APPLICATIONS

The present application claims priority to Japanese Patent Application No. 2015-225687, filed Nov. 18, 2015, the entire contents of which are incorporated herein by reference.

BACKGROUND OF THE INVENTION

Field of the Invention

The present invention relates to a solid electrolytic capacitor in which an anode is Al foil including a core portion and a porous portion, and a cathode includes a solid electrolyte, and more particularly, a solid electrolytic capacitor which has great reliability.

Description of the Related Art

Solid electrolytic capacitors in which an anode is Al foil including a core portion and a porous portion, and a cathode includes a solid electrolyte are used for various electronic devices because the capacitors are long in product life, low in calorific value, and charged and discharged at high rates. Japanese Patent Application Laid-Open No. 2005-26257 proposes an example of such a solid electrolytic capacitor.

Figure 10:
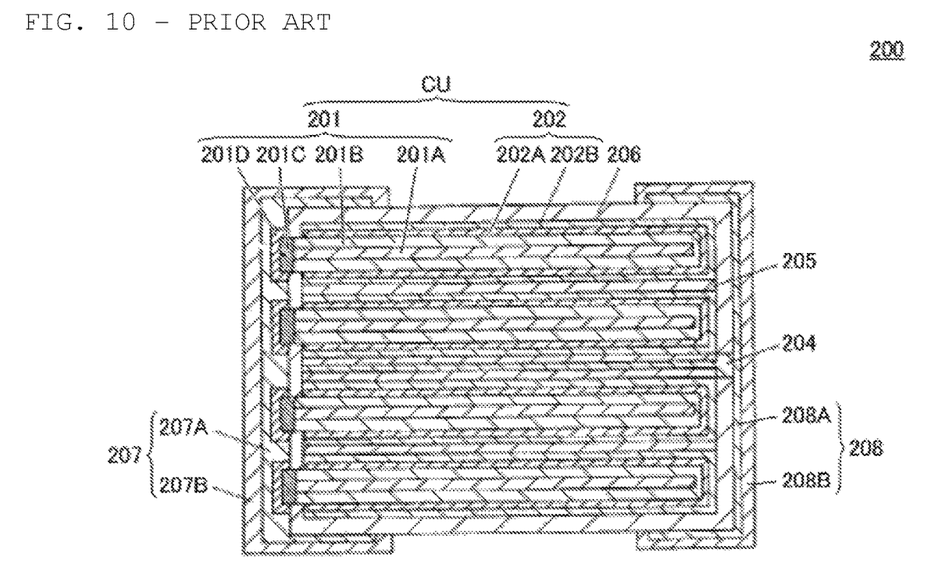
FIG. 10 is a cross-sectional view of a solid electrolytic capacitor 200 according to the related art.

FIG. 10 is a cross-sectional view of a sold electrolytic capacitor 200 disclosed in Japanese Patent Application Laid-Open No. 2005-26257. The sold electrolytic capacitor 200 includes a plurality of capacitor elements CU each including an anode 201, a dielectric layer (not shown), and a cathode 202; Cu foil 204; an exterior member 206; and a first external electrode 207 and a second external electrode 208.

The anode 201 is Al foil including a core portion 201A and a porous portion 201B. At an end of the anode 201 closer to the first external electrode 207, a Zn layer 201C is formed, and a Ni layer 201D is formed on the surface of the Zn layer 201C. The dielectric layer is an Al oxide film formed on the surface of the porous portion 201B. The Zn layer 201C is formed by zinc substitution of a part of the Al oxide film formed on the surface of the porous portion 201B. The cathode 202 includes a solid electrolyte layer 202A formed on the Al oxide film surface, and a current collector layer 202B formed on the surface of the solid electrolyte layer 202A. Predetermined numbers of the capacitor elements CU are stacked on both front and back surfaces of the Cu foil 204. In FIG. 10, two capacitor elements CU are stacked on the front surface of the Cu foil 204, whereas two capacitor elements CU are stacked on the back surface thereof.

The capacitor elements CU adjacent to each other are attached to each other with a conductive adhesive 205. In addition, the Cu foil 204 and the capacitor element CU adjacent to the Cu foil 204 are attached to each other with the conductive adhesive 205. The exterior member 206 encloses therein the stacked capacitor elements CU and the Cu foil 204. The first external electrode 207 and the second external electrode 208 are formed on the surface of the exterior member 206. The first external electrode 207 connected to the anodes 201 includes a first Ni layer 207A and a second Ni layer 207B. The second external electrode 208 connected to the cathodes 202 with the Cu foil 204 interposed therebetween includes a first Ni layer 208A and a second Ni layer 208B.

In the solid electrolytic capacitor 200, the Zn layer 201C and the Ni layer 201D, at the end of each anode 201 exposed from the exterior member 206, are supposed to achieve high reliability with low impedance.

SUMMARY OF THE INVENTION

In the solid electrolytic capacitor 200, the Zn layer 201C is formed by zinc substitution of a part of the Al oxide film formed on the surface of the porous portion 201B as mentioned above. This zinc substitution is carried out by immersing the ends of the anodes 201 exposed from the exterior member 206 in an aqueous solution of NaOH containing Zn, with the capacitor elements CU enclosed in the exterior member 206.

On the other hand, the porous portion 201B has extremely small pores, and it is difficult for the resin forming the exterior member 206 to penetrate sufficiently into the porous portion 201B. Therefore, there is a possibility that ingress of water into the capacitor elements CU through the porous portion cannot be suppressed when zinc substitution is carried out. In addition, a masking material may be provided on ends of the capacitor elements CU in the zinc substitution or re-chemical conversion so that the treatment liquid will not adhere to other regions. Also in this case, it is difficult for an uncured liquid masking material to penetrate sufficiently into the porous portion 201B, and there is thus a possibility that ingress of water from the outside cannot be suppressed as with the foregoing case.

In addition, there is a possibility that ingress of water from the outside cannot be suppressed, not only when the solid electrolytic capacitor 200 is placed in a water-containing liquid, for example, in the case of zinc substitution and in the case of plating treatment, but also when the solid electrolytic capacitor 200 is placed, for example, in high-humidity environments. As a result, there is a possibility that water ingress into the solid electrolytic capacitor 200 can adversely affect the reliability of the solid electrolytic capacitor 200.

Therefore, an object of the present invention is to provide a solid electrolytic capacitor which suppresses ingress of water from the outside, and has great reliability.

A solid electrolytic capacitor according to the present invention includes a capacitor element, an exterior member, and a first external electrode and a second external electrode.

The capacitor element includes an anode, a dielectric layer, and a cathode. The anode has a core portion and a porous portion, and contains Al. The dielectric layer contains an Al oxide disposed on a predetermined surface of the porous portion. The cathode includes a solid electrolyte layer disposed on the dielectric layer surface.

The exterior member seals the capacitor element therein, such that an end of the anode is exposed from the exterior member. The first external electrode is disposed on the surface of the exterior member, and electrically connected to the cathode. The second external electrode is disposed on the surface of the exterior member, and electrically connected to the end of the anode.

Further, the porous portion in a region where the cathode is not disposed includes a portion whose thickness is smaller than the porous portion in a region where the cathode is disposed.

More specifically, the porous portion at the end of the anode exposed from the exterior member is smaller in thickness than the porous portion in the region with the cathode disposed thereon.

More preferably, a region of the anode where the cathode is not disposed includes a portion without any porous portion.

In addition, in the solid electrolytic capacitor according to the present invention, the end of the anode is preferably exposed from the exterior member has no porous portion.

According to the present invention, a solid electrolytic capacitor can be provided which can suppress ingress of water from the outside, and has great reliability.

DETAILED DESCRIPTION OF THE INVENTION

Features of the present invention will be described in more detail below with reference to embodiments of the present invention. The solid electrolytic capacitor according to the present invention is used in, but not limited to, for example, the application of smoothing the voltages at input and output stages of various power circuits, and the back-up application for variations in voltage load around CPUs.

First Embodiment of Solid Electrolytic Capacitor—

A first embodiment of a solid electrolytic capacitor 100 according to the present invention will be described with reference to FIGS. 1 and 2.

While a perspective view or the like generally illustrating the solid electrolytic capacitor 100 will be omitted, this solid electrolytic capacitor 100 has a substantially cuboid shape. A direction in which capacitor elements CU shown in FIG. 1 are stacked is referred to as a T direction. A direction perpendicular to the T direction, in which anodes 1 are extended to the surface of an exterior member 6, is referred to as an L direction. A direction perpendicular to each of the T direction and L direction is referred to as a W direction. The solid electrolytic capacitor 100 has a first end surface and a second end surface that extend in the W direction and T direction. In addition, the solid electrolytic capacitor 100 has a first side surface and a second side surface that extend in the L direction and T direction. Further, the capacitor has a first principal surface and a second principal surface that extend in the L direction and W direction. In this regard, the first end surface and the second end surface are opposed to each other, the first side surface and the second side surface are opposed to each other, and the first principal surface and the second principal surface are opposed to each other. It is to be noted that the solid electrolytic capacitor 100 may have corners and ridges rounded as long as the capacitor has a substantially cuboid shape.

Figure 1:
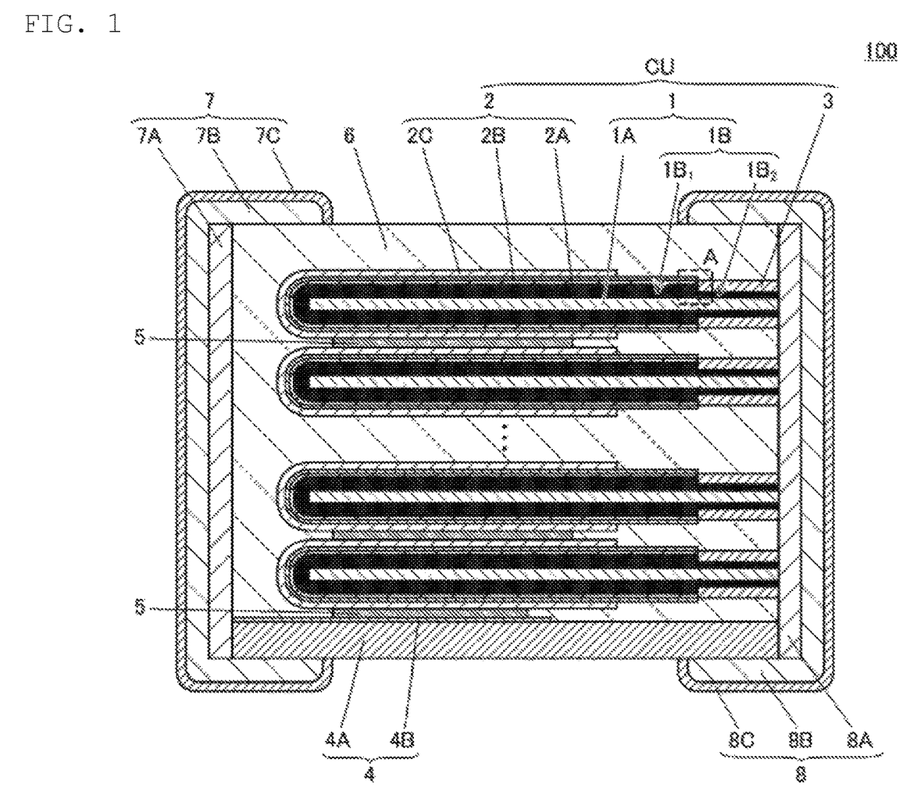
FIG. 1 is a cross-sectional view of a solid electrolytic capacitor 100 as a first embodiment of a solid electrolytic capacitor according to the present invention.

FIG. 1 is an LT cross-sectional view of the solid electrolytic capacitor 100 cut along the L direction and the T direction. The solid electrolytic capacitor 100 includes the capacitor elements CU, a substrate 4, the exterior member 6, a first external electrode 7 and a second external electrode 8.

The capacitor elements CU each include the anode 1, a dielectric layer d, and a cathode 2. Details of the dielectric layer d are shown in FIG. 2. The anode 1 is Al foil including a core portion 1A and a porous portion 1B. While the porous portion 1B is formed on both sides of the core portion 1A in the T direction in the present embodiment, the porous portion 1B may be formed only on one side of the core portion 1A in the T direction. The dielectric layer d is an Al oxide film formed on the surface of the porous portion 1B. The cathode 2 includes a solid electrolyte layer 2A formed on the surface of the dielectric layer d, a C layer (carbon layer) 2B as a current collector, and an Ag layer 2C.

The dielectric layer d is obtained by the formation of an Al oxide film through anodization of the Al foil surface in an aqueous solution of ammonium adipate. In addition, for example, large-sized Al foil with an Al oxide film formed thereon may be cut into individual pieces. In such a case, there is a need to carry out treatment of so-called re-chemical conversion by which an Al oxide film is formed on the cut surface. This treatment of re-chemical conversion is also carried out by anodization of the cut surface with the use of an aqueous solution of ammonium adipate in the same way as mentioned above.

The solid electrolyte layer 2A is obtained by the formation of a polymer film of poly(3,4-ethylenedioxythiophene) on the surface of the dielectric layer d in pores of the porous portion 1B with the use of, for example, a treatment liquid containing 3,4-ethylenedioxythiophene and an oxidant.

While the solid electrolyte layer 2A is formed to fill all the pores of the porous portion 1B in this embodiment, the surface of the dielectric layer d has only to be coated, and some of the pores may remain unfilled with the solid electrolyte layer 2A. In addition, a Zn layer may be formed by zinc substitution on ends of the anodes 1, which are connected to the second external electrode 8.

In addition, according to this embodiment, the capacitor elements CU each further include a masking material 3 of an insulator such as a polyimide resin or a polyamideimide resin for defining the region where the solid electrolyte layer 2A is formed. However, there is no need for this masking material 3.

The substrate 4 includes a base 4A and an extended conductor 4B formed on a principal surface of the base 4A. In this regard, the principal surface of the base 4A refers to a surface on which the capacitor elements CU are stacked with a conductive adhesive 5 interposed therebetween. For the base 4A, a composite material is used which includes, for example, a woven fabric or a non-woven fabric made of glass or silica, and an insulating resin such as an epoxy resin.

In addition, for example, a Cu pattern conductor is formed as the extended conductor 4B.

According to this embodiment, a predetermined number of capacitor elements CU are stacked on the substrate 4. The conductive adhesive 5 connects the cathodes 2 of the capacitor elements CU adjacent to each other, and connects the cathode 2 of the capacitor element CU adjacent to the substrate 4 to the extended conductor 4B of the substrate 4. For the conductive adhesive 5, an Ag paste or the like is used. It is to be noted that a single capacitor element CU may be employed. Alternatively, different types of conductive adhesives may be used to connect the cathodes 2 to each other, and to connect the cathode 2 to the extended conductor 4B.

The exterior member 6 has the capacitor elements CU enclosed therein on the substrate 4 so that the ends of the cathodes 1 and ends of the extended conductor 4B are exposed, with the cathode 2 and the extended conductor 4B connected. The exterior member 6 can be formed with the use of, for example, an insulating resin material with a glass material, a Si oxide, or the like dispersed therein as a filler.

It is to be noted that while the cathodes 2 are extended to the surface of the exterior member 6 with the extended conductor 4B of the substrate 4 interposed therebetween in this embodiment, the substrate 4 may be omitted. In this case, a conductor is connected to the cathode 2, and the conductor is extended to the surface of the exterior member 6. Alternatively, the cathodes 2 may be exposed directly to the surface of the exterior member 6.

The first external electrode 7 and the second external electrode 8 are formed on predetermined regions of the exterior member surface. The second external electrode 8 connected to the ends of the anodes 1 includes a first plated layer 8A, a conductive resin layer 8B, and a second plated layer 8C. The first plated layer 8A can be, for example, a composite plated layer including a Ni layer and an Au layer.

The Ni layer in the first plated layer 8A is preferably formed after Pd microparticles as nuclei for plating growth are provided on the predetermined regions of the surface of the exterior member 6, and the ends of the anodes 1. Alternatively, a Zn layer may be formed by zinc substitution treatment on the ends of the anodes 1, a first Ni layer may be formed by electroless plating on the surface of the Zn layer, thereafter, Pd microparticles as nuclei for plating growth may be provided on the predetermined regions of the surface of the exterior member 6 and the ends of the anodes 1, that is, on the surface of the first Ni layer, and thereafter, a second Ni layer may be formed by electroless plating. The first plated layer 8A is preferably formed on the entire end surface of the exterior member 6 at which the ends of the anodes 1 are exposed.

The conductive resin layer 8B is formed with the use of, for example, a resin material with Ag or the like dispersed therein as a filler. The second plated layer 8C can be, for example, a composite plated layer including a Ni layer and a Sn layer. However, the materials of the first plated layer 8A, the conductive resin layer 8B, and the second plated layer 8C are not limited to the foregoing.

The first external electrode 7 electrically connected to the cathodes 2 with the extended conductor 4B interposed therebetween includes a first plated layer 7A, a conductive resin layer 7B, and a second plated layer 7C. The first plated layer 7A, the conductive resin layer 7B, and the second plated layer 7C are formed respectively in the same ways as the first plated layer 8A, the conductive resin layer 8B, and the second plated layer 8C. The first plated layer 7A is preferably formed on the entire end surface of the exterior member 6 at which the end of the extended conductor 4B is exposed. The formation of the conductive resin layer 7B and the conductive resin layer 8B may be omitted, if necessary. In this case, it becomes easier to reduce the size of the solid electrolytic capacitor.

It is to be noted that while the first external electrode 7 is electrically connected to the cathodes 2 with the extended conductor 4B interposed therebetween in this embodiment, the first external electrode 7 may be connected directly to the cathodes 2, with the cathodes 2 exposed from the exterior member 6.

Figure 2:
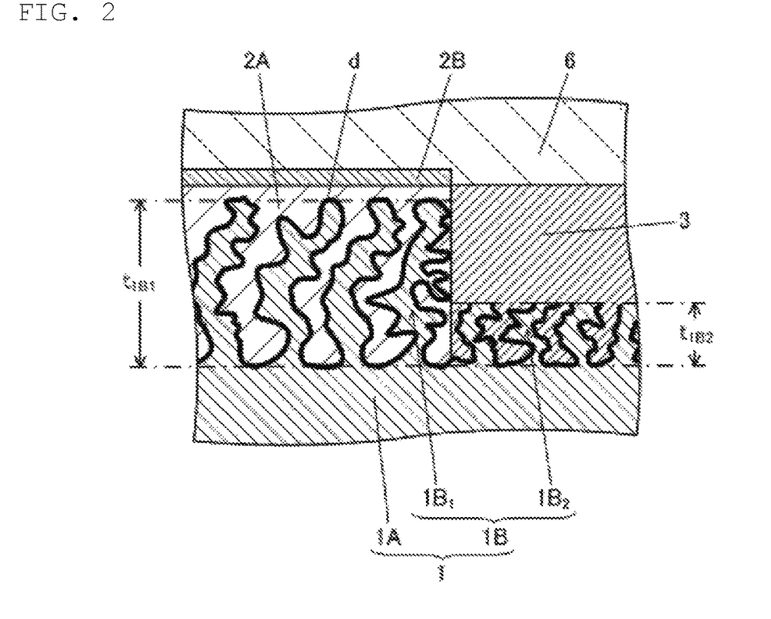
FIG. 2 is an enlarged view of a region A indicated by a dotted line in FIG. 1.

Further, as shown in FIG. 2, according to this embodiment, the porous portion 1B includes: a cathode formation region $1B_1$ with the cathode 2 formed on the dielectric layer d at the surface; and a reduced thickness region $1B_2$ that is smaller in thickness as compared with the cathode formation region $1B_1$. No cathode is disposed on the porous portion in the reduced thickness region $1B_2$. The reduced thickness region $1B_2$ includes the end of the anode 1, exposed from the exterior member 6. More specifically, a thickness $t_{1B2}$ of the porous portion in the reduced thickness region $1B_2$ is smaller than a thickness $t_{1B1}$ of the porous portion in the region with the cathode formed thereon.

In addition, the thickness of the anode 1 in the area with the reduced thickness region $1B_2$ is smaller than the thickness of the anode 1 in the area with the cathode formation region $1B_1$. More specifically, the total thickness of the reduced thickness region $1B_2$ and the core portion 1A in the area with the reduced thickness region $1B_2$ is smaller than the total thickness of the cathode formation region $1B_1$ and the core portion 1A in the area with the cathode formation region $1B_1$. Thus, there is a difference in height between the cathode formation region $1B_1$ and the reduced thickness region $1B_2$.

In other words, the solid electrolytic capacitor 100 has, in the T direction: a first part including the cathode formation region $1B_1$ of the porous portion 1B, the solid electrolyte layer 2A, and the C layer 2B as a current collector layer on the core portion 1A; and a second part including the reduced thickness region $1B_2$ of the porous portion 1B and the masking material 3 on the core portion 1A. Further, in the case of comparison of the height from the outermost surface of the core portion 1A, as indicated by a dashed-dotted line in the cross-sectional view of FIG. 2, the height of the porous portion 1B (cathode formation region $1B_1$) provided in the first part is larger than the height of the porous portion 1B (reduced thickness region $1B_2$) provided in the second part.

In the solid electrolytic capacitor 100 described above, the porous portion 1B in the region without any cathode 2 disposed thereon has the reduced thickness region $1B_2$, and the masking material 3 or the exterior member 6 is thus more likely to penetrate even into the porous portion 1B at the small-thickness site. In addition, it is possible to reduce the proportion of the porous portion 1B into which ingress of water is relatively likely to be caused. Therefore, the ingress of water from the outside can be suppressed not only when the solid electrolytic capacitor is placed in water, but also when the solid electrolytic capacitor is placed in high-humidity environments. As a result, a solid electrolytic capacitor can be provided which has great reliability.

In addition, in the solid electrolytic capacitor 100 described above, when the capacitor elements CU are stacked on the substrate 4, it is possible to increase the distance between the reduced thickness regions $1B_2$ of the capacitor elements CU adjacent to each other, and the distance between the substrate 4 and the reduced thickness region $1B_2$ of the capacitor element CU adjacent to the substrate 4. For this reason, when the exterior member 6 encloses therein the capacitor elements CU on the substrate 4, a liquid resin material for the exterior member is more likely to penetrate between the reduced thickness regions $1B_2$ of the capacitor elements CU adjacent to each other, and between the substrate 4 and the reduced thickness region $1B_2$ of the capacitor element CU adjacent to the substrate 4. Therefore, the enclosure with the exterior member 6 is improved.

Figure 3:
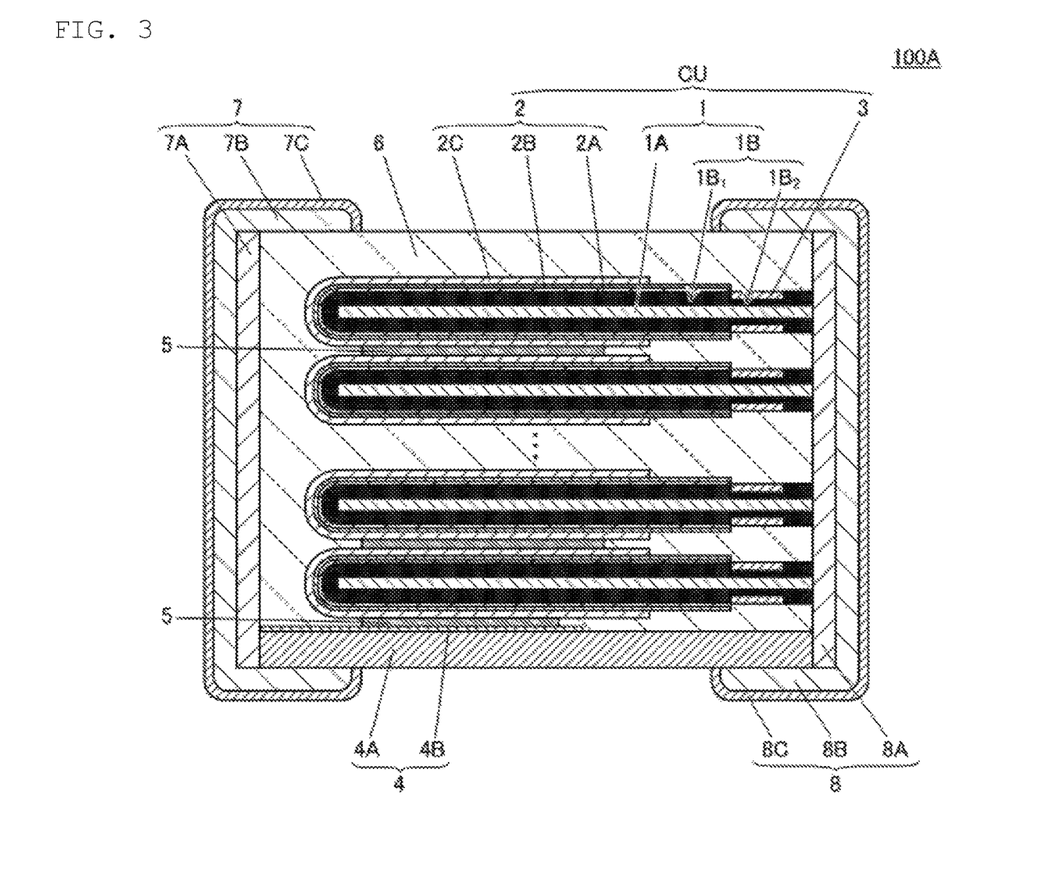
FIG. 3 is a cross-sectional view of a solid electrolytic capacitor 100A as a first modification example of the first embodiment of the solid electrolytic capacitor according to the present invention.

It is to be noted that the reduced thickness region is preferably formed over the entire part of the porous portion 1B without any cathode 2 provided thereon, as shown in FIG. 1. However, as in a solid electrolytic capacitor 100A as a first modification example of this embodiment as shown in FIG. 3, the reduced thickness region may be formed partially over the part without any cathode 2 provided thereon.

Figure 4:
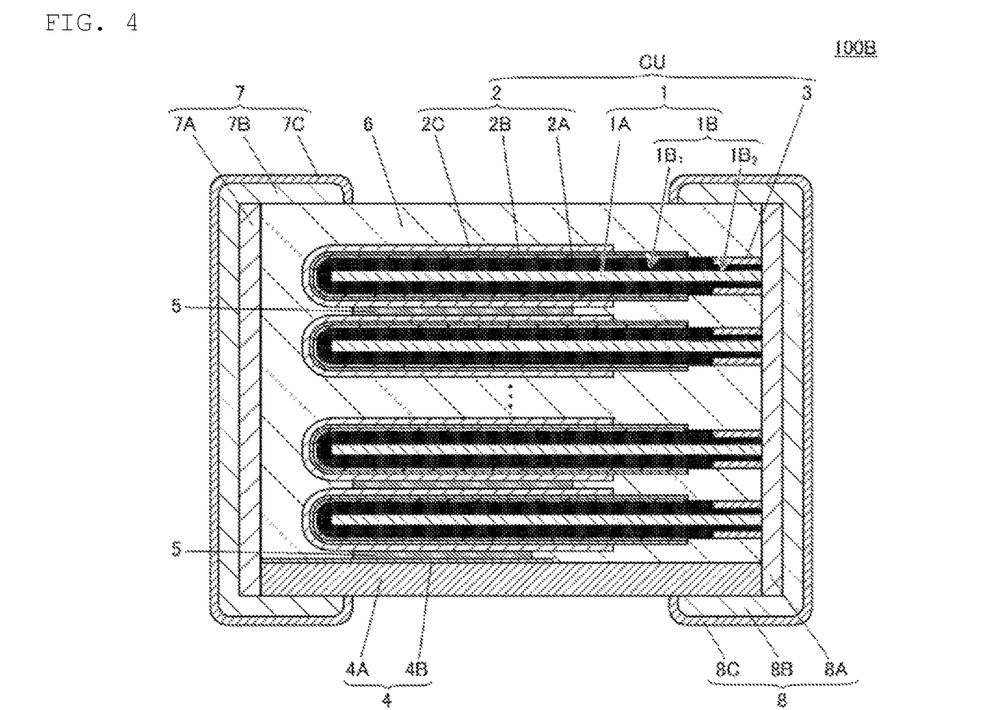
FIG. 4 is a cross-sectional view of a solid electrolytic capacitor 100B as a second modification example of the first embodiment of the solid electrolytic capacitor according to the present invention.

When the reduced thickness region $1B_2$ is formed partially over the part without any cathode 2 provided thereon, the reduced thickness region $1B_2$ is preferably formed closer to the outside, that is, closer the end of the anode 1 exposed from the exterior member 6. Furthermore, as in a solid electrolytic capacitor 100B as a second modification example of this embodiment as shown in FIG. 4, the reduced thickness region $1B_2$ is more preferably formed at the end of the anode 1 exposed from the exterior member 6.

In the solid electrolytic capacitor described above, the porous portion exposed from the exterior member is small in thickness, and ingress of water from the outside can thus be suppressed closer to the outside. As a result, a solid electrolytic capacitor can be provided which has greater reliability. It is to be noted that when the part without any cathode 2 provided thereon is all adopted as the reduced thickness region $1B_2$, the ingress of water from the outside can be suppressed more effectively.

In addition, the thickness $t_{1B2}$ of the porous portion in the reduced thickness region is preferably ¾ or less, more preferably ½ or less, and further preferably ¼ or less of the thickness $t_{1B1}$ of the porous portion in the region with the cathode formed thereon. As the thickness $t_{1B2}$ of the porous portion in the reduced thickness region $1B_2$ is smaller, ingress of water can be suppressed more effectively.

Furthermore, the length of the reduced thickness region along the length, that is, in the L direction is preferably ¾ or more of the length of the region of the anode without any cathode disposed thereon in the L direction. As the reduced thickness region is larger in length, ingress of water can be suppressed more effectively.

This reduced thickness region $1B_2$ can be formed by removing a predetermined area and a predetermined depth of the porous portion 1B at the end of the anode 1, for example, with high-power pulsed laser light through laser oscillation from a Q switch-YAG laser system. Alternatively, the reduced thickness region $1B_2$ may be obtained in a way that the porous portion 1B of the anode 1 is compressed in the T direction so as to reduce the volume of the pores.

In this regard, a method for measuring the thickness $t_{1B1}$ of the porous portion in the region with the cathode formed thereon and the thickness $t_{1B2}$ of the porous portion in the reduced thickness region will be described with reference to FIG. 5.

Figure 5:
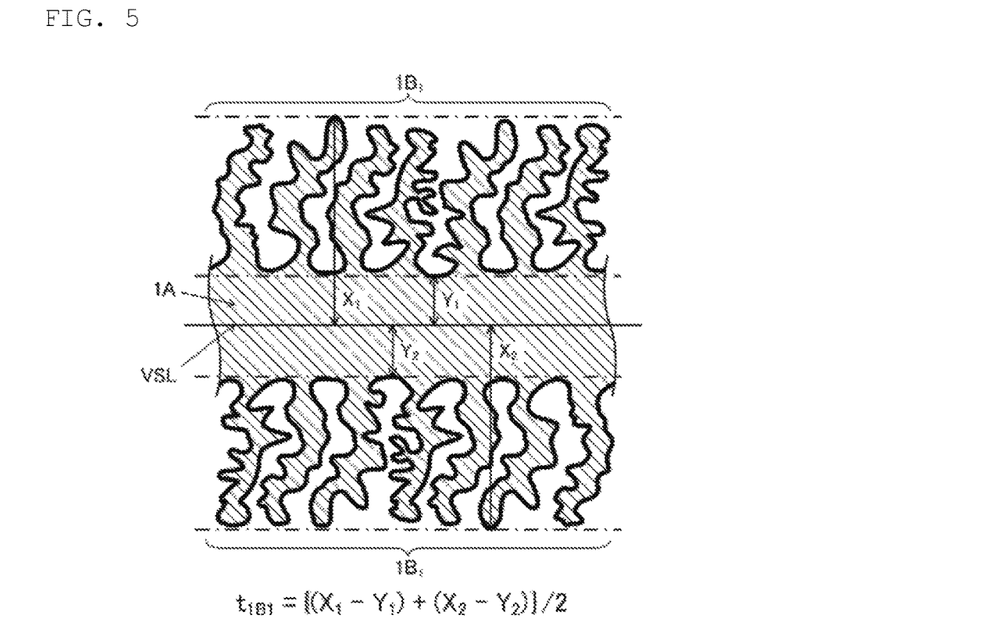
FIG. 5 is a diagram schematically illustrating a method for measuring a thickness $t_{1B1}$ of a cathode formation region $1B_1$ of a porous portion 1B in the solid electrolytic capacitor 100.

FIG. 5 is a diagram schematically illustrating a method for measuring the thickness $t_{1B1}$ of the porous portion in the region with the cathode formed thereon. It is to be noted that the thickness $t_{1B2}$ of the porous portion in the reduced thickness region is also measured by the same method.

The LT surface of the solid electrolytic capacitor 100 defined by the L direction and the T direction was polished down to a depth on the order of ½ in the W direction, thereby providing an LT cross section. At this LT cross section, an area around ½ of the length of the cathode formation region $1B_1$ of the anode 1 in the L direction was regarded as an observation surface. The observation surface was observed with a SEM, and photographed. The shooting range is determined appropriately depending on the size of the object to be observed, and was for example, 200 µm in L direction× 200 µm in T direction.

Next, on the photograph taken, a line VSL was drawn in the L direction around the central part of the core portion 1A of the anode 1 in the T direction.

Next, the longest distance $X_1$ and the shortest distance $Y_1$ were each figured out among the distances between the surface of the cathode formation region $1B_1$ disposed on one side of the core portion 1A in the T direction and the line VSL. In addition, the longest distance $X_2$ and the shortest distance $Y_2$ were each figured out among the distances between the surface of the cathode formation region $1B_1$ disposed on the other side of the core portion 1A in the T direction and the line VSL. However, these distances are actually the distances from the surfaces of the dielectric layers d to the line VSL, because the dielectric layers d are extremely thin.

Then, the average value for the difference between the distance $X_1$ and the distance $Y_1$ and the difference between the distance $X_2$ and the distance $Y_2$ was regarded as the thickness $t_{1B1}$ of the porous portion in the region with the cathode formed thereon. More specifically, the thickness $t_{1B1}=((X_1-Y_1)+(X_2-Y_2))/2$. In addition, the sum of the distance $Y_1$ and the distance $Y_2$ was regarded as the thickness of the core portion 1A.

It is to be noted that when the porous portion 1B is formed on only one side of the core portion 1A in the T direction, the difference between the distance $X_1$ and the distance $Y_1$ is regarded as the thickness $t_{1B1}$ of the porous portion in the region with the cathode formed thereon. More specifically, the thickness $t_{1B1}=X_1-Y_1$.

As mentioned above, when the thickness $t_{1B2}$ of the porous portion in the reduced thickness region is smaller than the thickness $t_{1B1}$ of the porous portion in the region with the cathode formed thereon, the masking material 3 or the exterior member 6 can penetrate sufficiently into the reduced thickness region $1B_2$ at the end of the anode 1. In addition, the space occupied by the porous portion can be reduced at the end of the anode, which is likely to serve as a penetration pathway of water. Therefore, the ingress of water from the outside can be suppressed not only when the solid electrolytic capacitor is placed in water, but also when the solid electrolytic capacitor is placed in high-humidity environments. As a result, the solid electrolytic capacitor 100 can be obtained which has great reliability.

Second Embodiment of Solid Electrolytic Capacitor—

A solid electrolytic capacitor 100C as a second embodiment of a solid electrolytic capacitor according to the present invention will be described with reference to FIGS. 6 and 7.

Figure 6:
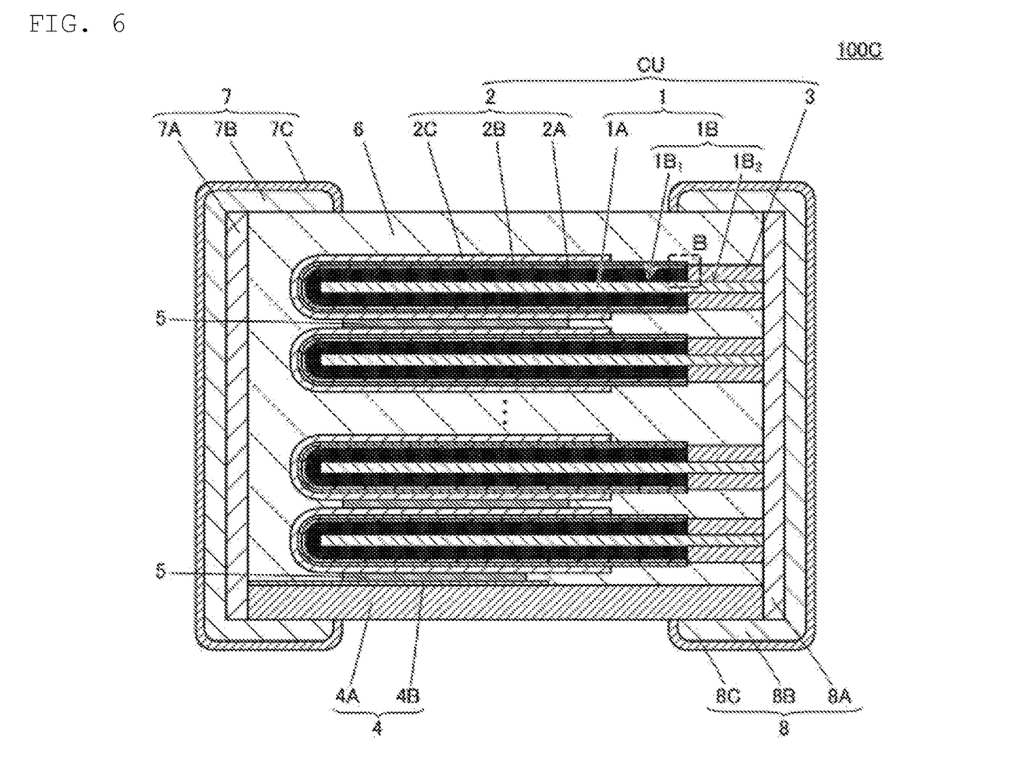
FIG. 6 is a cross-sectional view of a solid electrolytic capacitor 100C as a second embodiment of a solid electrolytic capacitor according to the present invention.

FIG. 6 is an LT cross-sectional view of the solid electrolytic capacitor 100C in the L direction and the T direction. The solid electrolytic capacitor 100C differs from the solid electrolytic capacitor 100 in the structure of the anode 1. The solid electrolytic capacitors 100 and 100C are common in other points, and descriptions of the common parts will be thus omitted.

The difference in the structure of the anode 1 between the solid electrolytic capacitor 100 and the solid electrolytic capacitor 100C will be described below. As described above, when the solid electrolytic capacitor 100 is observed in a cross-sectional view in the L direction and the T direction, each anode 1 has a part where the reduced thickness region $1B_2$ of the porous portion 1B and the masking material 3 are stacked in the T direction, as shown in FIG. 1. In contrast, in the solid electrolytic capacitor 100C shown in FIG. 6, each anode 1 has no part where a porous portion 1B and a masking material 3 are stacked in the T direction. In other words, there is, on the core portion 1A, a part provided with only the masking material 3.

Figure 7:
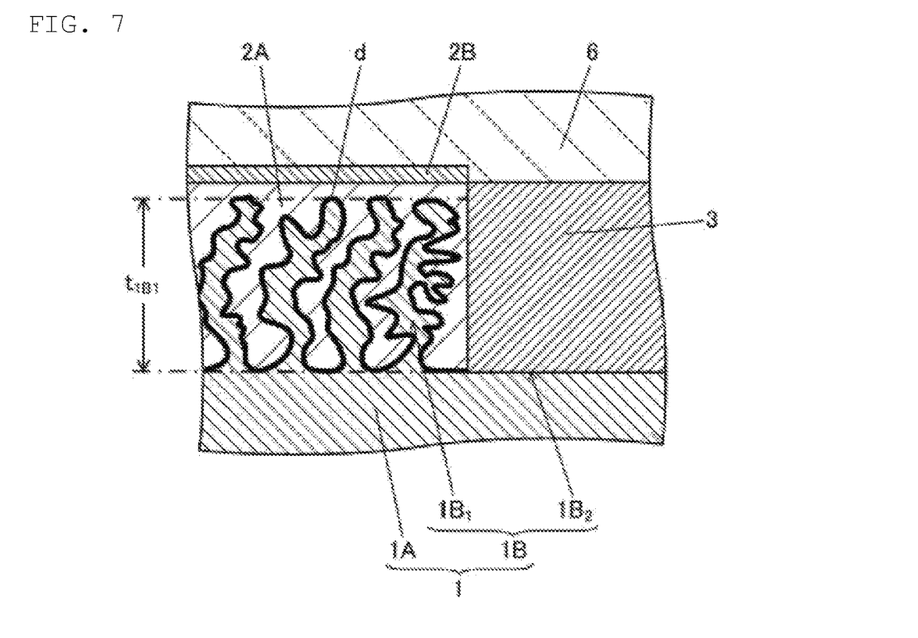
FIG. 7 is an enlarged view of a region B indicated by a dotted line in FIG. 6.

More specifically, as shown in FIG. 7 in detail, in the solid electrolytic capacitor 100C according to this embodiment, the part corresponding to the reduced thickness region $1B_2$ of the porous portion 1B in the solid electrolytic capacitor 100 has substantially no porous portion. Therefore, the core portion 1A is exposed at an end of the anode 1 exposed from the exterior member 6, with the masking material 3 or the exterior member 6 in direct contact with the surface of the relatively flat core portion 1A at the end of the anode 1.

As a result, the adhesion is further enhanced between the masking material 3 or the exterior member 6 and the anode 1. In addition, there is substantially no porous portion 1B at the end of the anode 1, which is likely to serve as a penetration pathway of water. As a result, the ingress of water from the outside can be suppressed more effectively, and the solid electrolytic capacitor 100C can be obtained which has greater reliability.

It is to be noted that the reduced thickness region $1B_2$ with substantially no porous portion is formed by, as with the reduced thickness region $1B_2$ of the solid electrolytic capacitor 100, removing a predetermined area and a predetermined depth of the porous portion 1B, for example, with high-power pulsed laser light through laser oscillation from a Q switch-YAG laser system. Therefore, a case of causing a part of the porous portion 1B to slightly remain due to incomplete removal with a laser is also conceivable in an actual manufacturing situation, and this case corresponds to a case of "substantially no porous portion provided" in this specification.

Figure 8:
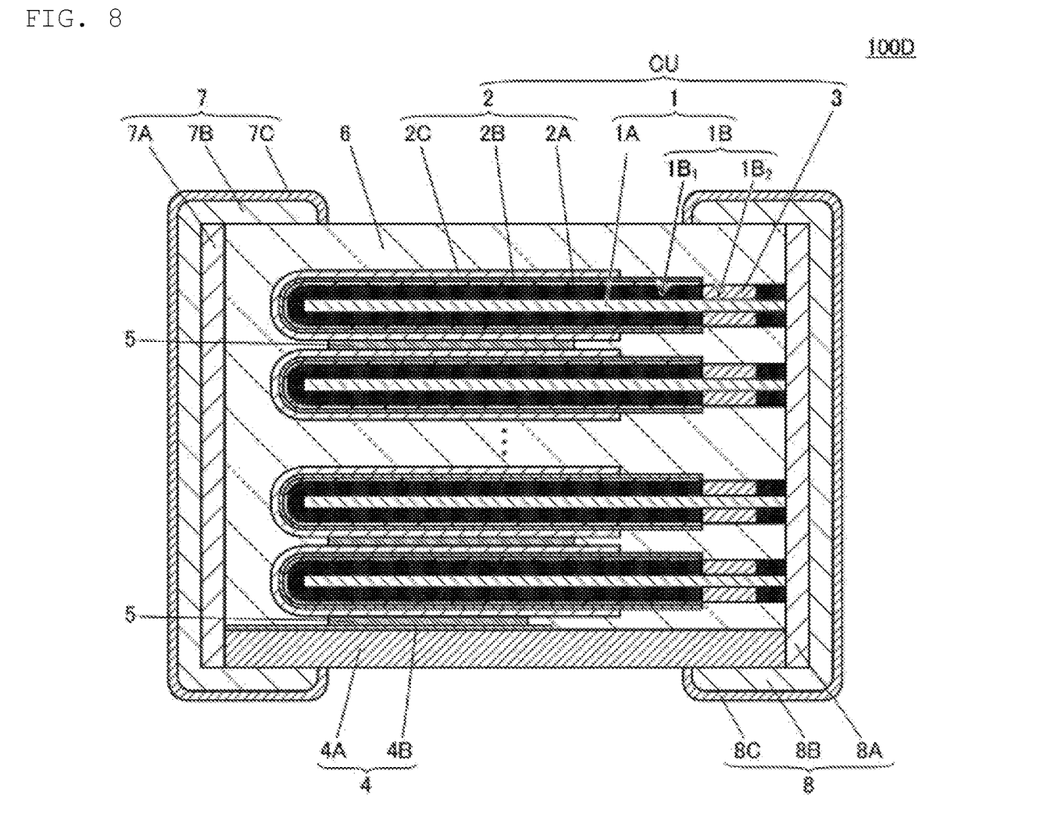
FIG. 8 is a cross-sectional view of a solid electrolytic capacitor 100D as a first modification example of the second embodiment of the solid electrolytic capacitor according to the present invention.

It is to be noted that the reduced thickness region $1B_2$ with substantially no porous portion 1B is preferably formed over the entire region of the anode 1 without any cathode 2 disposed thereon. However, as in a solid electrolytic capacitor 100D as a first modification example of this embodiment as shown in FIG. 8, the reduced thickness region $1B_2$ may be formed partially over the region of the anode 1 without any cathode 2 disposed thereon.

Figure 9:
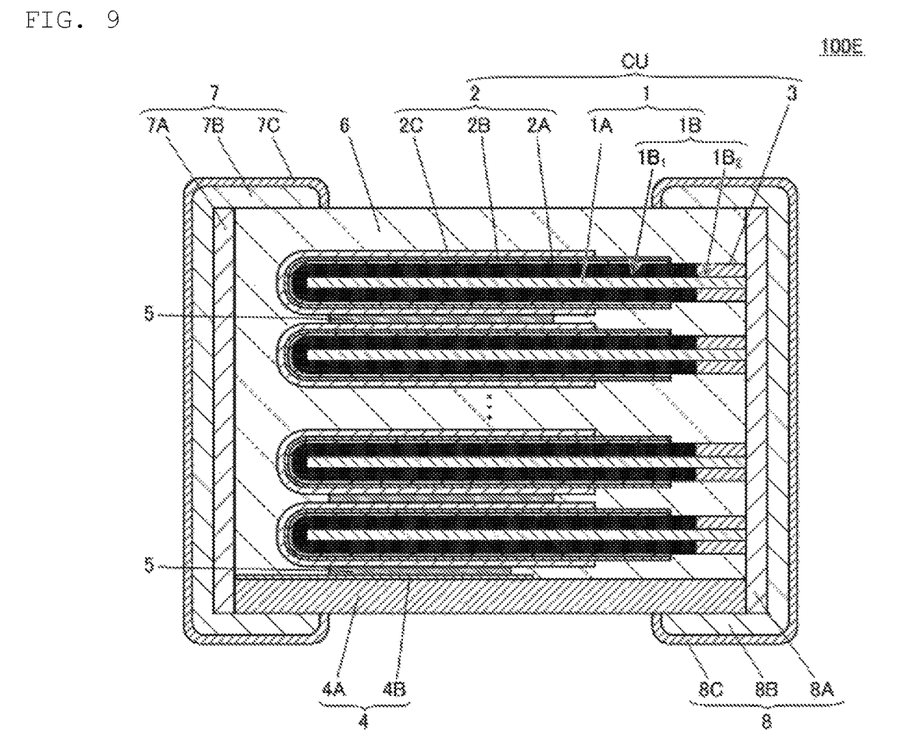
FIG. 9 is a cross-sectional view of a solid electrolytic capacitor 100E as a second modification example of the second embodiment of the solid electrolytic capacitor according to the present invention.

When the reduced thickness region $1B_2$ is formed partially over the region of the anode 1 without any cathode 2 disposed thereon, the reduced thickness region $1B_2$ is preferably formed closer to the outside, that is, closer the end of the anode 1 exposed from the exterior member 6. Furthermore, as in a solid electrolytic capacitor 100E as a second modification example of this embodiment as shown in FIG. 9, the reduced thickness region $1B_2$ is more preferably formed at the end of the anode 1 exposed from the exterior member 6.

In the solid electrolytic capacitor described above, ingress of water from the outside can thus be more effectively suppressed closer to the outside. As a result, a solid electrolytic capacitor can be provided which has greater reliability. It is to be noted that when the reduced thickness region is formed over the entire region of the anode 1 without any cathode 2 disposed thereon, the ingress of water from the outside can be suppressed more effectively.

Experimental Example—

Next, based on an experimental example, the present invention will be described more specifically. In this experimental example, based on the second embodiment, samples according to Examples 1 through 3 within the scope of the present invention, and samples according to Comparative Examples 1 and 2 were prepared. It is to be noted that a polyimide resin, a glass-epoxy substrate, and a sealing resin of epoxy with a Si oxide dispersed therein as a filler were used respectively for the masking material, the base, and the exterior member in this experimental example.

In addition, the core portion of the anode was made 30 µm in thickness, and the porous portion of the anode, that is, the porous portion in the region with the cathode formed thereon was made 40 µm in thickness. The removal of the porous portion was carried out with the use of Q switch-YAG laser, and the porous portion was substantially eliminated in the reduced thickness region $1B_2$. Eight capacitor elements CU were stacked.

Example 1 is a solid electrolytic capacitor as shown in FIG. 6. The solid electrolytic capacitor had a size of 3.5 mm in length×2.8 mm in width×1.9 mm in height. Example 2 is a solid electrolytic capacitor obtained without forming the first plated layer 7A of the first external electrode 7 and the first plated layer 8A of the second external electrode 8 in FIG. 6. Example 3 is a solid electrolytic capacitor obtained without forming the conductive resin layer 7B of the first external electrode 7 and the conductive resin layer 8B of the second external electrode 8 in FIG. 6.

Comparative Example 1 is a solid electrolytic capacitor obtained without forming the reduced thickness region $1B_2$ of the porous portion 1B in FIG. 6, with the porous portion 1B of a substantially uniform thickness to the surface of the exterior member 6. Comparative Example 2 is a solid electrolytic capacitor obtained without forming the reduced thickness region $1B_2$ of the porous portion 1B in FIG. 6, and without forming the first plated layer 7A of the first external electrode 7 and the first plated layer 8A of the second external electrode 8 in FIG. 4. Examples 2 and 3 as well as Comparative Examples 1 and 2 have the same structure as Example 1, except for the difference described above.

The tests and measurements shown in Table 1 below were carried out with the use of five samples for each of the samples according to Examples 1 through 3 and the samples according to Comparative Examples 1 and 2. In addition, the average values of measurement values obtained from the respective five samples were calculated, and regarded as measurement results in each example. These measurement results are shown in Table 2. It is to be noted that the samples were determined to be non-defective products when the rate of change of equivalent series resistance and the rate of change of leakage current were respectively 100% or less and 500% or less after the moisture resistance test. Otherwise, the samples were determined to be defective products.

TABLE 1

| | Test Conditions |
|---|---|
| Moisture Resistance Test | Samples were left for 500 hours in an atmosphere at 60° C./relative humidity: 93%. |
| Deflection Test | A glass-fiber reinforced epoxy resin substrate with a sample soldered theteto was bent at a speed of 1 mm/sec to reach a deflection amount of 3 mm, and the substrate was kept in the condition for 5 ± 1 sec (the test was carried out once). |

TABLE 1-continued

| Test Conditions | |
| --- | --- |
| Measurement of Equivalent Series Resistance | The equivalent series resistance was measured at 100 kHz. |
| Measurement of Leakage Current | The leakage current after application of a direct-current voltage of 16 V for 2 min was measured. (Protective Resistance: 1 kΩ) |

TABLE 2

| | Initial Condition | | After Moisture Resistance Test | | After Deflection Test | |
| --- | --- | --- | --- | --- | --- | --- |
| | Equivalent Series Resistance ESR (mΩ) | Leakage Current LC (μA) | Equivalent Series Resistance 100 kHz (mΩ) | Leakage Current LC (μA) | Equivalent Series Resistance 100 kHz (mΩ) | Leakage Current LC (μA) |
| Example 1 | 20 | 1.3 | 23 (+15%) | 3.4 (+162%) | 24 (+20%) | 2.3 (+76%) |
| Example 2 | 368 | 1.5 | 505 (+37%) | 3.8 (+151%) | 518 (+41%) | 6.4 (+323%) |
| Example 3 | 18 | 1.4 | 21 (+17%) | 3.6 (+155%) | 74 (+311%) | 11.5 (+715%) |
| * Comparative Example 1 | 16 | 2.1 | 48 (+200%) | 154.2 (+7200%) | 42 (+163%) | 113.0 (+5250%) |
| * Comparative Example 2 | 396 | 1.8 | 512 (+29%) | 189.4 (+10449%) | 508 (+28%) | 164.7 (+9076%) |

(ESR was measured at 100 kHz)
*: outside the scope of the present invention

According to the measurement results shown in Table 2, it is determined that because the solid electrolytic capacitors according to Comparative Examples 1 and 2 have no reduced thickness region 1B₂ formed, ingress of water from the outside is likely to be caused, thereby resulting in substantial changes in electrical properties after the moisture resistance test. On the other hand, it is determined that the solid electrolytic capacitors according to Examples 1 to 3, that is, the present invention suppress ingress of water from the outside, thereby reducing changes in electrical properties after the moisture resistance test.

Further, Example 2 and Comparative Example 2 have high equivalent series resistance values in the initial condition. This is presumed to be because the area of electrical connection between the anode and the second external electrode was reduced, thereby increasing the resistance, due to the conductive resin layer in direct contact with the end of the anode without the formation of the first plated layer of the first external electrode and the first plated layer of the second external electrode in Example 2 and Comparative Example 2.

In addition, the change in equivalent series resistance value after the moisture resistance test is relatively small in Comparative Example 2. This is presumed to be because the decreased equivalent series resistance value in the moisture resistance test is obscured, due to the intrinsically high equivalent series resistance value in the initial condition of Comparative Example 2.

It is to be noted that the present invention is not to be considered limited to the embodiments described above, but various applications and modifications can be made within the scope of the invention. In addition, the embodiments described in this specification are merely illustrative, and it is to be noted that it is possible to partially replace or combine the configurations between different embodiments.

What is claimed is:

1. A solid electrolytic capacitor comprising:
a capacitor element comprising:
an anode including a core portion and a porous portion, the porous portion having a first portion with a first thickness and a second portion with a second thickness, the first thickness being less than the second thickness,
a dielectric layer covering the porous portion, and
a cathode comprising a solid electrolyte layer covering at least part of the second portion of the porous portion and not the first portion of the porous portion;
an exterior member sealing the capacitor element such that an end of the anode is exposed from the exterior member;
a masking material covering the first portion and a side of the second portion that defines a difference in thickness between the first thickness of the first portion and the second thickness of the second portion;
a first external electrode electrically connected to the cathode; and
a second external electrode electrically connected to the end of the anode.

2. The solid electrolytic capacitor according to claim 1, wherein the first portion of the porous portion includes the end of the anode.

3. The solid electrolytic capacitor according to claim 1, wherein the anode is an Al-containing anode.

4. The solid electrolytic capacitor according to claim 1, wherein the dielectric layer is an Al oxide-containing dielectric layer.

5. The solid electrolytic capacitor according to claim 1, wherein the second external electrode includes a plated layer connected to the end of the anode.

6. The solid electrolytic capacitor according to claim 1, wherein the first portion of the porous portion is separated from the end of the anode.

7. The solid electrolytic capacitor according to claim 1, wherein the first thickness is ¾ or less of the second thickness.

8. A solid electrolytic capacitor comprising:
a capacitor element comprising:

an anode including first portion with a first thickness and a second portion with a second thickness, the first thickness being less than the second thickness, the first portion including a core portion, and the second portion including the core portion and a porous portion, a dielectric layer covering the porous portion, and a cathode comprising a solid electrolyte layer covering at least part of the second portion of the anode and not the first portion of the anode;

an exterior member sealing the capacitor element such that an end of the anode is exposed from the exterior member;

a masking material covering the first portion and a side of the second portion that defines a difference in thickness between the first thickness of the first portion and the second thickness of the second portion;

a first external electrode electrically connected to the cathode; and a second external electrode electrically connected to the end of the anode.

9. The solid electrolytic capacitor according to claim 8, wherein the first portion of the anode includes the end of the anode.

10. The solid electrolytic capacitor according to claim 8, wherein the anode is an Al-containing anode.

11. The solid electrolytic capacitor according to claim 8, wherein the dielectric layer is an Al oxide-containing dielectric layer.

12. The solid electrolytic capacitor according to claim 8, wherein the second external electrode includes a plated layer connected to the end of the anode.

13. The solid electrolytic capacitor according to claim 8, wherein the first portion of the porous portion is separated from the end of the anode.

* * * * *